United States Patent
Guizilini et al.

(10) Patent No.: US 11,551,363 B2
(45) Date of Patent: Jan. 10, 2023

(54) SYSTEMS AND METHODS FOR SELF-SUPERVISED RESIDUAL FLOW ESTIMATION

(71) Applicant: TOYOTA RESEARCH INSTITUTE, INC., Los Altos, CA (US)

(72) Inventors: Vitor Guizilini, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 46 days.

(21) Appl. No.: 16/892,885

(22) Filed: Jun. 4, 2020

(65) Prior Publication Data

US 2021/0383553 A1     Dec. 9, 2021

(51) Int. Cl.
| | | |
|---|---|---|
| G06T 7/20 | (2017.01) | |
| G01S 13/08 | (2006.01) | |
| G06T 3/00 | (2006.01) | |
| G01C 21/28 | (2006.01) | |
| G01S 17/42 | (2006.01) | |

(52) U.S. Cl.
CPC ............... *G06T 7/20* (2013.01); *G01C 21/28* (2013.01); *G01S 13/08* (2013.01); *G01S 17/42* (2013.01); *G06T 3/0093* (2013.01); *G06T 2207/10016* (2013.01); *G06T 2207/20081* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 2018/0205941 A1* | 7/2018 | Kopf | H04N 13/282 |
| 2018/0268519 A1* | 9/2018 | Liebenow | G06F 3/012 |
| 2019/0057509 A1 | 2/2019 | Lv et al. | |
| 2019/0139179 A1* | 5/2019 | Wang | G06N 3/088 |
| 2019/0325595 A1* | 10/2019 | Stein | G08G 1/165 |
| 2020/0098135 A1* | 3/2020 | Ganjineh | G06T 7/11 |
| 2020/0160546 A1* | 5/2020 | Gu | G06T 3/0093 |
| 2020/0372710 A1* | 11/2020 | Wang | B29C 64/386 |
| 2021/0237774 A1* | 8/2021 | Tang | G06N 3/08 |
| 2021/0319577 A1* | 10/2021 | Tang | G06T 7/55 |
| 2021/0366082 A1* | 11/2021 | Xiao | G06T 7/285 |
| 2022/0130015 A1* | 4/2022 | Yun | H04N 19/86 |

OTHER PUBLICATIONS

Deep Video Super-Resolution Network Using Dynamic Upsampling Filters Without Explicit Motion Compensation. Jo et al. (Year: 2018).*

(Continued)

*Primary Examiner* — Delomia L Gilliard
(74) *Attorney, Agent, or Firm* — Seyfarth Shaw LLP

(57) ABSTRACT

A method includes generating a first warped image based on a pose and a depth estimated from a current image and a previous image in a sequence of images captured by a camera of the agent. The method also includes estimating a motion of dynamic object between the previous image and the target image. The method further includes generating a second warped image from the first warped image based on the estimated motion. The method still further includes controlling an action of an agent based on the second warped image.

20 Claims, 8 Drawing Sheets

(56) References Cited

OTHER PUBLICATIONS

Meng, et al., "SIGNet: Semantic Instance Aided Unsupervised 3D Geometry Perception", SIGNet: Semantic Instance Aided Unsupervised 3D Geometry Perception, Jun. 15-20, 2019.
Yang, et al., "SIGNet: Semantic Instance Aided Unsupervised 3D Geometry Perception", arXiv: 1806.10556, Aug. 15, 2018.
Kashyap, et al., "Sparse Representations for Object and Ego-motion Estimation in Dynamic Scenes", arXiv:1903.03731, Mar. 9, 2019.

* cited by examiner

SYSTEMS AND METHODS FOR SELF-SUPERVISED RESIDUAL FLOW ESTIMATION

BACKGROUND

Field

Certain aspects of the present disclosure generally relate to depth estimation and scene reconstruction.

Background

Autonomous agents (e.g., vehicles, robots, etc.) use onboard sensors to facilitate generating a three-dimensional (3D) representation of a surrounding environment. The 3D representation may be used for various tasks, such as localization and/or autonomous navigation. The 3D representation accuracy improves the autonomous agent's ability to perform various tasks. It is desirable to improve the accuracy of a 3D representation constructed from one or more images captured by the autonomous agent.

SUMMARY

In one aspect of the present disclosure, a method is disclosed. The method includes generating a first warped image based on a pose and a depth estimated from a current image and a previous image in a sequence of images captured by a camera of the agent. The method also includes estimating a motion of dynamic object between the previous image and the target image. The method further includes generating a second warped image from the first warped image based on the estimated motion. The method still further includes controlling an action of an agent based on the second warped image.

In another aspect of the present disclosure, a non-transitory computer-readable medium with non-transitory program code recorded thereon is disclosed. The program code is executed by a processor and includes program code to generate a first warped image based on a pose and a depth estimated from a current image and a previous image in a sequence of images captured by a camera of the agent. The program code also includes program code to estimate a motion of dynamic object between the previous image and the target image. The program code further includes program code to generate a second warped image from the first warped image based on the estimated motion. The program code still further includes program code to control an action of an agent based on the second warped image.

Another aspect of the present disclosure is directed to an apparatus. The apparatus having a memory, one or more processors coupled to the memory, and instructions stored in the memory. The instructions being operable, when executed by the processor, to cause the apparatus to generate a first warped image based on a pose and a depth estimated from a current image and a previous image in a sequence of images captured by a camera of the agent. The instructions additionally cause the apparatus to estimate a motion of dynamic object between the previous image and the target image. The instructions further cause the apparatus to generate a second warped image from the first warped image based on the estimated motion. The instructions still further cause the apparatus to control an action of an agent based on the second warped image.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
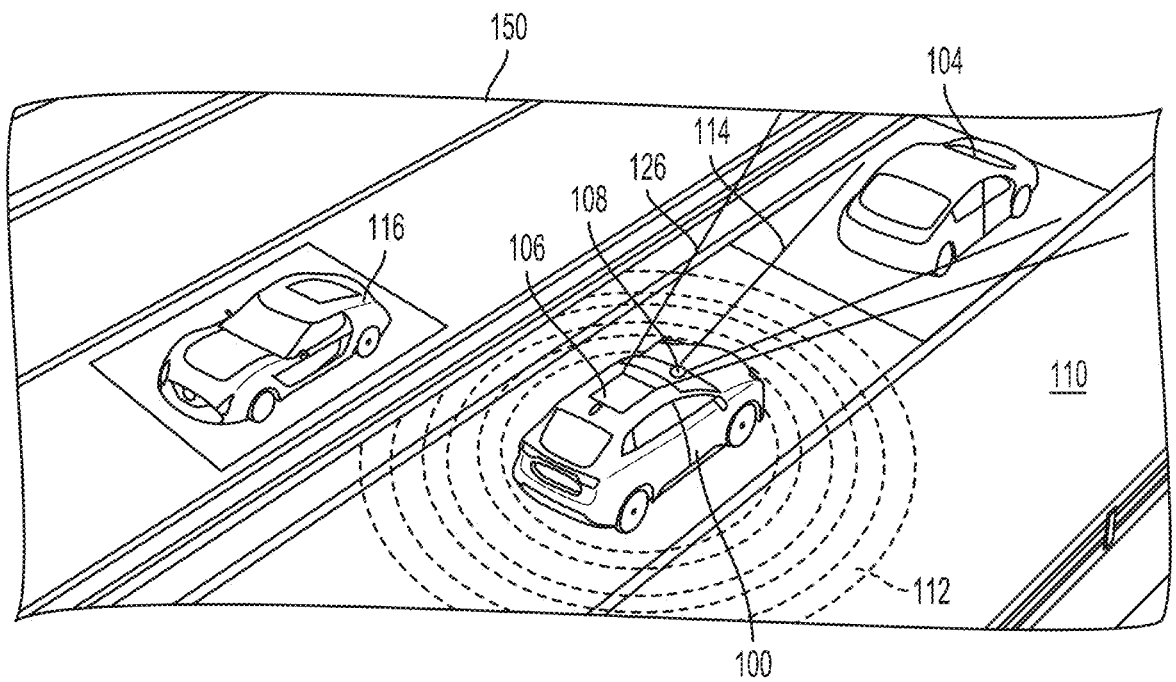
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may generate a 3D representation of an environment based on one or more images obtained from a sensor. The 3D representation may also be referred to as a 3D model, a 3D scene, or a 3D map. 3D representations may facilitate various tasks, such as scene understanding, motion planning, and/or obstacle avoidance. For example, the agent may autonomously navigate through an environment based on the 3D representation.

The ability to perceive distances through depth estimation based on sensor data provides an ability to plan/estimate ego-motion through the environment. However, depending on the available onboard sensors, the agent may acquire a limited perspective of the environment. As a result, the agent may encounter difficulties in distinguishing aspects of the environment.

That is, various sensors perceive aspects of the environment differently and have different implementation characteristics. For example, LiDAR (light detection and ranging) provides improved depth perception but may encounter errors in certain weather conditions. Other sensors, such as stereo cameras, may capture depth information but may have a limited field-of-view. Monocular cameras may be cost-effective, however, the sensor data does not explicitly include depth information.

In some cases, an agent implements processing routines for deriving depth information from the monocular images. For example, conventional depth networks generate 3D representations based on hand-engineered features. That is, the depth network may be trained to estimate depth via labeled data (e.g., supervised training).

Deep learning approaches, such as self-supervised learning, may eliminate hand-engineered features (e.g., labeled data) and improve depth estimates as well as 3D model reconstruction. For example, deep learning approaches improve the reconstruction of textureless regions and/or geometrically under-determined regions. Aspects of the present disclosure are directed to improving depth estimates and single-image scene reconstruction via self-supervised learning.

Aspects of the present disclosure are not limited to an autonomous agent. Aspects of the present disclosure also contemplate an agent operating in a manual mode or a semi-autonomous mode. In the manual mode, a human driver manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used to generate a 3D representation of an environment.

As discussed, conventional systems use one or more sensors, such as LIDAR, to build 3D representations of a local environment. LIDAR sensors may provide reliable and accurate range data at large distances. A LIDAR sensor may be used for a variety of applications, such as mapping, localization, object detection, and collision avoidance.

Still, due to their cost, LIDAR sensors may not be economically viable. Additionally, a LIDAR sensor's 3D reconstruction may be sparse. Cameras, such as a red-green-blue (RGB) camera, may provide a dense semantic and spatial understanding of the scene by reasoning across space and time. Additionally, cameras may be more economically viable in comparison to LIDAR sensors.

Aspects of the present disclosure are directed to training and implanting a scene reconstruction network to build a 3D representation of a scene from one or more images captured by a single camera. In one configuration, the self-supervised training for image-based depth estimation leverages geometric constraints inherent in robots.

In one configuration, depth and ego-motion are estimated from monocular camera imagery. Aspects of the present disclosure improve monocular depth estimates generated from a depth network trained in a self-supervised manner. Improved monocular depth estimates bridge a gap between LIDAR and vision solutions, such that cameras may augment, complement, or substitute range sensors (e.g., LIDAR sensors).

The bridged gap may reduce costs and provide an increased number of robust solutions because cameras compliment range sensor functionality. For example, in comparison to a LIDAR sensor, a camera may function better in some environments, such as a rainy environment. In contrast, in comparison to the camera, the LIDAR sensor may function better in other environments, such as low-light conditions. Therefore, monocular depth estimates may improve an agent's ability to perform various tasks.

Furthermore, cameras may produce a greater amount of image data in comparison to LIDAR data. The image data may be used as training data for a depth network. As such, the use of a monocular sensor may increase the amount of training data, thereby improving self-supervised monocular depth estimates.

In the current disclosure, unless otherwise noted, a self-supervised monocular depth network refers to a depth network trained in a self-supervised manner to generate a 3D representation from a single-camera. Self-supervised training refers to learning from raw input data without any ground-truth information. The self-supervised monocular depth network may also be referred to as a self-supervised single-camera depth network. The self-supervised monocular depth network may recover depth if a camera's motion is estimated between timesteps (e.g., frames).

A supervised monocular depth network refers to a depth network trained in a supervised manner. The supervised monocular depth network learns an estimation function by regressing input images to estimated depth outputs. In supervised training, the network learns from labeled ground-truth information. For example, supervised monocular depth networks may use ground truth depth (e.g., LIDAR data) to train a neural network as a regression model. As such, the monocular depth network does not estimate the camera's motion during supervised training.

In a supervised depth network, a convolutional neural network generates an initial coarse prediction and refines the prediction using another neural network to produce more accurate results. As supervised techniques for depth estimation advance, the availability of target depth labels is reduced due to the costs of generating labeled data. For example, a task of manually labeling outdoor scenes is time consuming.

Thus, some conventional depth networks are trained with stereo cameras to mitigate the need for ground-truth depth labels. In a stereo-camera setting, a baseline distance between two cameras is known and fixed. Therefore, a stereo-camera depth network may estimate depth without estimating the camera's motion between timesteps.

Dynamic objects present a challenge for self-supervised monocular depth networks. In some cases, depth networks may fail to generate a scene when one or more dynamic objects are detected. Conventional photometric loss determined during training assumes a static world because the network assumes the camera's own motion (ego-motion) is the only source of motion. In some cases, a pose network learns the ego-motion.

In real-world scenarios, the world is not static. Dynamic objects, such as pedestrians and other vehicles, may pose a safety threat to the ego agent. Therefore, it is desirable to account for dynamic objects when generating a 3D representation of an environment.

Conventional depth networks address dynamic objects by masking out the dynamic objects or learning motion models for the dynamic objects. For example, a conventional depth network may obtain semantic or instance segmentation from another pre-trained network to generate a mask. However, the depth and pose networks cannot learn from masked out objects, thereby reducing model accuracy. Additionally, semantic or instance masks are learned via supervised training, which is in contrast to the self-supervised learning of the current disclosure.

Some conventional depth networks do not assume a static world and learn a motion of each pixel in an image. The motion of each pixel may be referred to as optical flow. Optical flow estimation may be challenging due to its ambiguity and lack of training data. For example, training data may be limited due to the difficulty in annotating (e.g., labeling) real images. Additionally, synthetic datasets are limited due to domain adaptation problems.

Conventional stereo camera configurations may learn optical flow via unsupervised training. These conventional systems are limited to scenarios where both images are simultaneously captured, and a baseline between cameras is known. In contrast, monocular camera configurations estimate optical flow via a pose network that models camera motion between frames.

In one configuration, a monocular depth network and a pose network are jointly trained in a self-supervised manner. The joint training may be combined with the training of residual flow estimates. That is, a depth and pose loss may be calculated for the monocular depth and pose networks and a residual loss may be calculated for the residual flow network. In one configuration, the residual flow network, monocular depth network, and the pose network are all different networks. For simplicity, the residual flow network may be referred to as the flow network. The monocular depth network and pose network may be components of a scene reconstruction neural network for generating a 3D estimate of a scene based on a 2D image.

In one configuration, a residual flow network receives a target image and a warped source image. The warped source image refers to the reconstructed target image. For example, the target image may be reconstructed to approximate depth and ego-motion (e.g., pose) of the original target image. The depth may be determined by a depth network and the pose may be determined by a pose network. The depth and pose networks are trained by minimizing a photometric loss between the target image and the warped source image.

The depth and pose networks may maintain the static world assumption. In one configuration, the depth and pose networks are augmented with the flow network. The flow network learns residual motion that cannot be explained by the pose and depth networks. For example, the residual motion may be due to the presence of dynamic objects. Aspects of the present disclosure decrease ambiguities and complexities of learning residual flow estimates. For example, a majority of the observed motion may be attributed to the camera's own motion (e.g., ego-motion) that is modeled by the depth and pose networks. Thus, the amount of training for learning residual flow estimates may be reduced.

Some conventional neural network frameworks, such as a training framework, may generate an initial flow estimate from ego-motion. This estimate is then refined using a third network. In contrast, aspects of the present disclosure decouple camera ego-motion and residual flow by enforcing residual flow training on warped images. The warped image received by the residual flow network considers ego-motion.

Additionally, in contrast to conventional depth networks, aspects of the present disclosure do not refine an initial estimate via a flow refinement stage. Rather, two warping stages are presented. A first warping stage warps an output of the depth and pose networks. A second warping stage warps an output of a flow network. The depth network, pose network, and flow network are differentiable modules. Therefore, the pipeline may be trained end-to-end from monocular video sequences.

In contrast to conventional systems, where the flow network refines an initial flow estimate, in some aspects, information from the flow network is not shared with the depth and pose networks. Combined with the use of two photometric losses for geometric supervision in different stages, the two networks learn different aspects of motion, one due to the camera's own relative motion and another due to the presence of external motion.

In one configuration, a photometric loss is applied to a first warped source image. The pose may be estimated from a source image corresponding to a previous or subsequent timestep. The target image may be from a current time step. The photometric loss is also applied to the second warped source image. The second warped source image is the first source target image that has been re-warped to account for external motion. The flow network may re-warp the first warped source image. As discussed, the photometric loss is applied at two stages.

Conventional convolutional architectures use striding and pooling to increase field sizes. The striding and pooling may decrease model performance for tasks requiring fine-grained representations. Additionally, conventional upsampling processes fail to propagate and preserve sufficient details at the decoder layers, thereby reducing the accuracy of depth predictions.

In contrast to conventional convolutional architectures, aspects of the present disclosure implement an encoder-decoder architecture with 3D packing and unpacking blocks. In one configuration, the packing and unpacking blocks downsample and upsample feature maps during the encoding and decoding stages. Additionally, the packing and unpacking blocks learn to jointly preserve and recover spatial information for depth estimation.

In one configuration, a packing block folds the spatial dimensions of convolutional feature maps into additional feature channels. That is, the feature space is concatenated. The resulting tensor is at a reduced resolution. In contrast to striding or pooling, the spatial dimension transformation is invertible and comes at no loss. Next, the concatenated feature space is compressed to reduce its dimensionality to a desired number of output channels. Specifically, the concatenated feature space is expanded via a 3D convolutional layer. The resulting higher dimensional feature space is then flattened via reshaping before applying the final 2D convolutional contraction.

The unpacking block may decompress and unfold packed convolutional feature channels back to higher resolution spatial dimensions during the decoding process. The unpacking block replaces convolutional feature upsampling, typically performed via nearest-neighbor or with learnable transposed convolutional weights. The unpacking process reverses the 3D packing process performed by the encoder.

During the unpacking process, a 2D convolutional layer produces the required number of feature channels for a subsequent 3D convolutional layer. The 3D convolution expands the compressed spatial features. The unpacked features are then converted back to spatial details via a reshape operation to obtain a tensor with the desired number of output channels and target higher resolution.

Figure 2A:
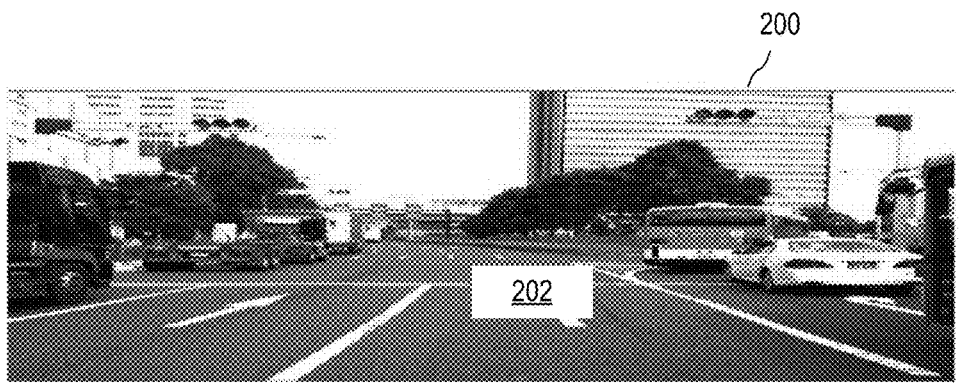
FIG. 2A is an example of a single image according to aspects of the present disclosure.

FIG. 2A illustrates an example of a target image 200 of a scene 202 according to aspects of the present disclosure. The target image 200 may be captured by a monocular camera. The monocular camera may capture a forward-facing view of an agent (e.g., a vehicle). In one configuration, the monocular camera is integrated with the vehicle. For example, the monocular camera may be defined in a roof structure, windshield, grill, or other portion of the vehicle. The vehicle may have one or more cameras and/or other types of sensors. The target image 200 may also be referred to as a current image. The target image 200 captures a 2D representation of a scene.

Figure 2B:
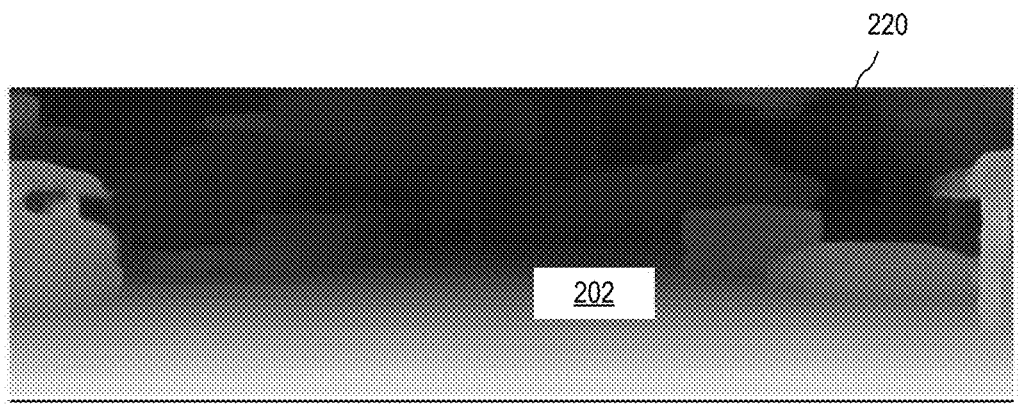
FIG. 2B is an example of a depth map according to aspects of the present disclosure.

FIG. 2B illustrates an example of a depth map 220 of the scene 202 according to aspects of the present disclosure. The depth map 220 may be estimated from the target image 200 and one or more source images. The source images may be images captured at a previous time step in relation to the target image 200. The depth map 220 provides a depth of a scene. The depth may be represented as a color or other feature.

Figure 2C:
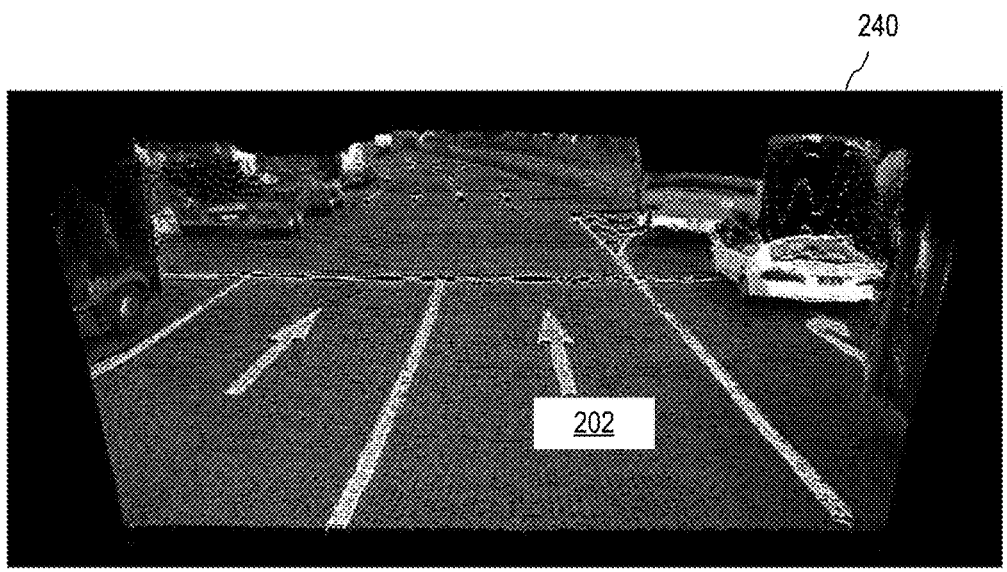
FIG. 2C is an example of a reconstructed target image according to aspects of the present disclosure.

FIG. 2C illustrates an example of a 3D reconstruction 240 of the scene 202 according to aspects of the present disclosure. The 3D reconstruction may be generated from the depth map 220 as well as a pose of the target image 200 and a source image. As shown in FIGS. 2A and 2C, the viewing angle of the scene 202 in the 3D reconstruction 240, is different from the viewing angle of the scene 202 in the target image 200. Because the 3D reconstruction 240 is a 3D view of the scene 202, the viewing angle may be changed as desired. The 3D reconstruction 240 may be used to control one or more actions of the agent.

Figure 3:
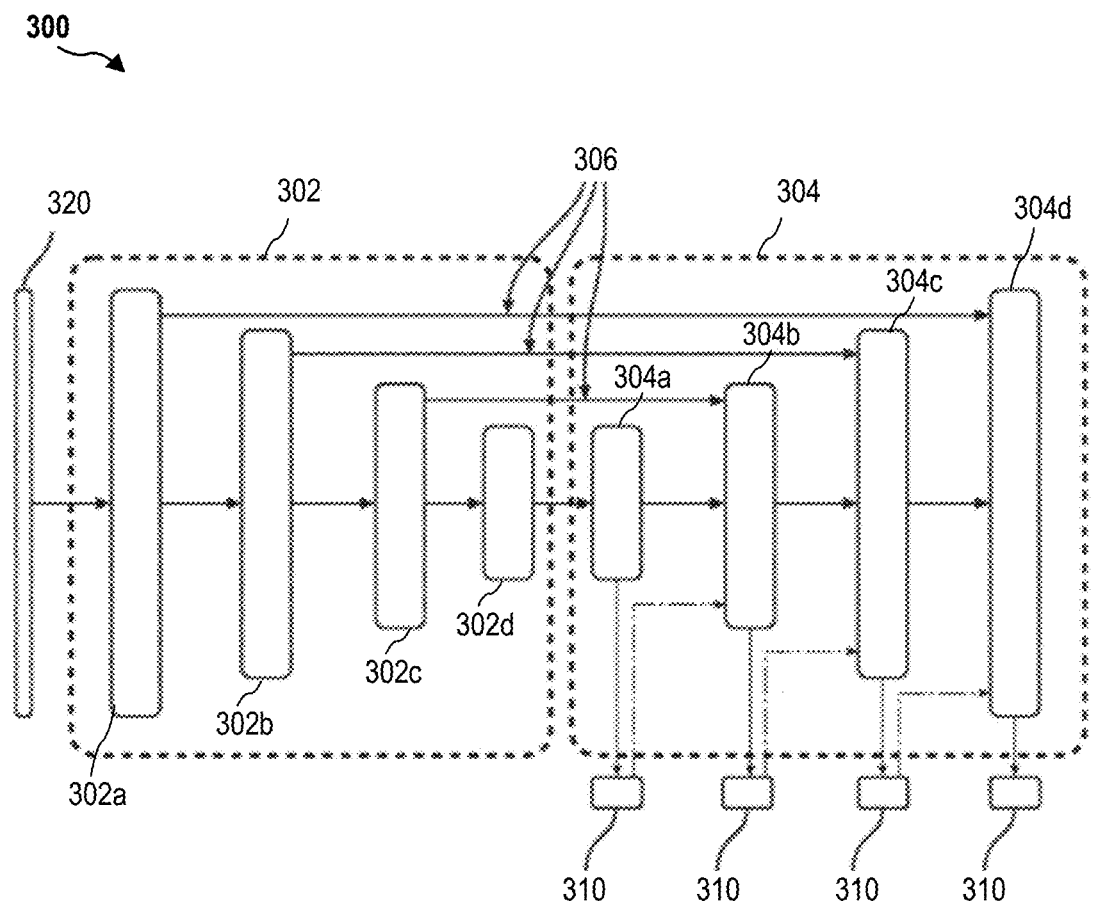
FIG. 3 illustrates an example of a depth network according to aspects of the present disclosure.

FIG. 3 illustrates an example of a depth network 300 according to aspects of the present disclosure. As shown in FIG. 3, the depth network 300 includes an encoder 302 and a decoder 304. The depth network 300 generates a per-pixel depth map, such as the depth map 220 of FIG. 2B, of an input image 320.

The encoder 302 includes multiple encoder layers 302a-d. Each encoder layer 302a-d may be a packing layer for downsampling features during the encoding process. The decoder 304 includes multiple decoder layers 304a-d. In FIG. 3, each decoder layer 304a-d may be an unpacking layer for upsampling features during the decoding process. That is, each decoder layer 304a-d may unpack a received feature map.

Skip connections 306 transmit activations and gradients between encoder layers 302a-d and decoder layers 304a-d. The skip connections 306 facilitate resolving higher resolution details. For example, a gradient may be directly back-propagated to layers via the skip connections 306, thereby improving training. Additionally, the skip connections 306 directly transmit image details (e.g., features) from convolutional layers to deconvolutional layers, thereby improving image recovery at higher resolutions.

The decoder layers 302a-d may generate intermediate inverse depth maps 310. Each intermediate inverse depth map 310 may be upsampled before being concatenated with a corresponding skip connection 306 and feature maps unpacked by a corresponding decoder layer 302a-d. The inverse depth maps 310 also serve as the output of the depth network from which the loss is calculated. In contrast to conventional systems that incrementally super-resolve each inverse depth map 310. Aspects of the present disclosure upsample each inverse depth map 310 to a highest resolution using bilinear interpolation. Upsampling to the highest resolution reduces copy-based artifacts and photometric ambiguity, thus improving depth estimates.

Figure 4:
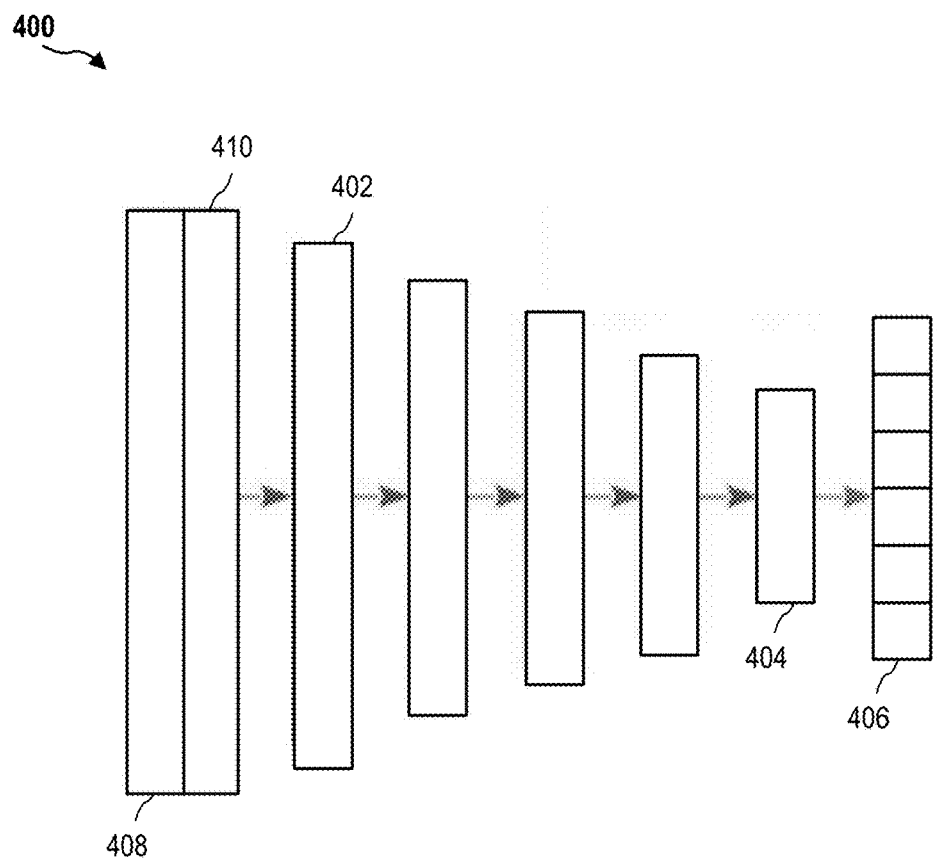
FIG. 4 illustrates an example of a pose network according to aspects of the present disclosure.

FIG. 4 illustrates an example of a pose network 400 for ego-motion estimation according to aspects of the present disclosure. In contrast to conventional pose networks, the pose network 400 of FIG. 4 does not use explainability masks. In conventional systems, the explainability mask removes objects that do not conform to a static world assumption.

As shown in FIG. 4, the pose network 400 includes multiple convolutional layers 402, a final convolutional layer 404, and a multi-channel (e.g., six-channel) average pooling layer 406. The final convolutional layer 404 may be a 1×1 layer. The multi-channel layer 406 may be a six-channel layer.

In one configuration, a target image ($I_t$) 408 and a source image ($I_s$) 410 are input to the pose network 400. The target image 408 and source image 410 may be concatenated together, such that the concatenated target image 408 and source image 410 are input to the pose network 400. During training, one or more source images 410 may be used during different training epochs. The source images 410 may include an image at a previous time step (t−1) and an image at a subsequent time step (t+1). The output is the set of six degrees of freedom (DoF) transformations between the target image 408 and the source image 410. The process may be repeated for each source image 410 if more than one source image 410 is considered.

Figure 5:
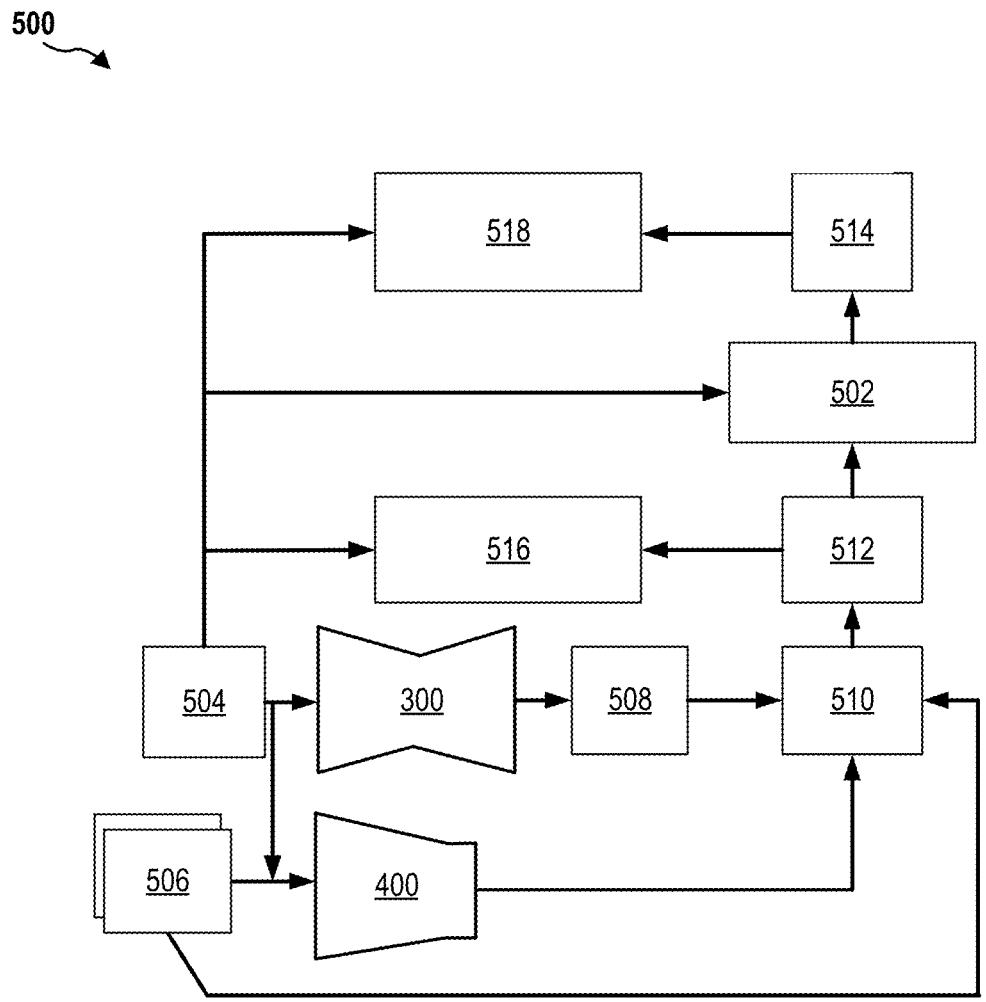
FIG. 5 illustrates an example of a training pipeline according to aspects of the present disclosure.

FIG. 5 illustrates an example of a residual flow training pipeline 500 for training a scene reconstruction neural network 550 according to aspects of the present disclosure. As shown in FIG. 5, residual flow training pipeline 500 trains the depth network 300 from FIG. 3, the pose network 400 from FIG. 4, and a residual flow network 502. The depth network 300 receives a target image ($I_t$) 504. The pose network 400 receives the target image 504 and one or more source images ($I_s$) 506. The source images 506 may also be referred to as context images.

As shown in FIG. 5, the depth network 300 generates a depth map ($\hat{D}_t$) 508 of target image 504. As discussed, the depth map 508 may be a per-pixel depth map. A view estimation module 510 receives the per-pixel depth map 508 and the six DoF transformation (e.g., relative pose) between the target image 504 and the source image 506. The view estimation module 510 inverse warps the source image 506 to reconstruct the target image 512. The inverse warp may also be referred to as a reverse warp. The reconstructed target image 512 may be referred to as the first warped source image 512 ($\hat{I}_t$).

Specifically, the view estimation module 510 generates the first warped source image 512 by sampling pixels from the source image 506 based on the predicted depth map 508 and the six DoF transformation. For example, each point (e.g., pixel) in the target image 504 may be projected on the source image 506 based on the predicted depth map 508 and camera pose. After projecting the point to the source image 506, bilinear interpolation may be used to warp the point to the first warped source image 512. That is, bilinear interpolation obtain the values (e.g., RGB values) of the point in the first warped source image 512 based on the source image 506.

That is, the location (e.g., x, y coordinates) of the point in the first warped source image 512 may correspond to the location of the point in the target image 504. Still, the color of the point in the first warped source image 512 may be based on colors of neighboring pixels in the source image 506. The first warped source image 512 may be a 3D reconstruction of a 2D target image. The first warped source image 512 is a reconstruction of the target image 504.

As discussed, the warped source image 512 does not consider external motion. In conventional systems, pixels for dynamic objects are masked and not included in the warped source image 512. In one configuration, the residual flow network 502 determines new pixel locations by warping the first warped source image 512.

The residual flow refers to motion that cannot be explained by the camera's own motion. The external motion cannot be modeled by a single ego-motion transformation. For example, the residual flow is an optical flow prediction which estimates how pixels of dynamic objects move across the screen over time. The optical flow assumes I(x, y, t)=I(x+Δx, y+Δy, t+Δt), where a pixel characteristic (e.g., RGB values) at time t is the same as the pixel characteristics at Δt but at a different location (denoted by Δx and Δy). The change in location may be predicted by the flow field.

For example, at time one, a pixel with RGB values (255, 255, 255) may be at an x, y position (10, 10) in a frame. The optical flow predicts that at time two, the same pixel with an RGB value (255, 255, 255) will still exist in the screen, and if there is motion, the pixel will exist at a different part of the frame, such as, for example, x, y position (15, 19). In this example, the optical flow displacement vector for this motion is [9, 5]. Thus, a new image may be obtained by applying the displacement vector to the original pixel position. Alternatively, the optical flow may correspond to the motion between a current image and a previous image. In one implementation, the optical flow is determined between the source image 506 (e.g., previous image) and the target image 504 (e.g., current image).

In some implementations, the residual flow network 502 estimates a residual flow based on the first warped source image 512 and the target image 504. The second warped source image ($\hat{I}_t$) 514 is generated by warping the first warped source image 512 using the residual flow estimates. The second warped source image 514 is warped based on external motion (e.g., dynamic objects), in contrast to warping due to the camera's ego-motion. For example, each point (e.g., pixel) in the target image is projected to the first warped source image 512 based on the predicted depth map 508 and residual motion (e.g., flow vector). After projecting the point to the first warped source image 512, bilinear interpolation may be used to warp the point to the second warped source image ($\hat{I}_t$) 514. That is, bilinear interpolation obtain the values (e.g., RGB values) of the point in the first warped source image 512. The location (e.g., x, y coordinates) of the point in the second warped source image 514 may correspond to the location of the point in the target image 504. Still, the color of the point in the second warped source image 514 may be based on colors of neighboring pixels in the first warped source image 512. The two warping stages improve accuracy.

As shown in FIG. 5, the training pipeline 500 determines two different photometric losses 516, 518. A first photometric loss 516 may be determined based on a comparison of the first warped source image 512 and the target image 504. A second photometric loss 518 may be determined based on a comparison of the second warped source image 518 and the target image 504.

The residual flow network learns to model residual flow (e.g., motion) based on the second photometric loss 518. The same weight coefficient may be used for both photometric losses 516, 518. Alternatively, different weight coefficients may be used. If a weight for the second photometric loss 518 (e.g., residual loss) is zero, the process is reduced to conventional self-supervised depth and pose learning from monocular videos. In contrast, if a weight of the first photometric loss 516 is zero, the process is reduced to residual flow learning.

The first photometric loss 516 ($L_p$) may be determined as follows:

$$L_p(I_t, \hat{I}_t) = \alpha \frac{1 - SSIM(I_t, \hat{I}_t)}{2} + (1-\alpha)\|I_t - \hat{I}_t\|, \quad (1)$$

where SSIM( ) is a function for estimating a structural similarity between the target image 504 and the first warped source image 512. SSIM may be determined as follows:

$$SSIM(x,y) = [l(x,y)]^\alpha \cdot [c(x,y)]^\beta \cdot [s(x,y)]^\gamma, \quad (2)$$

where s( ) determines a structure similarity, c( ) determines a contrast similarity, and l( ) determines a luminance similarity. α, β, and γ are parameters for adjusting a relative importance of each component, and each parameter is greater than zero.

During a testing stage, the training pipeline 500 may generate the second warped source image ($\hat{I}_t$) 514 as described above. The photometric losses 516, 518 may not be calculated during a testing stage. The second warped source image ($\hat{I}_t$) 514 may be used for localization and/or other vehicle navigation tasks.

Figure 6:
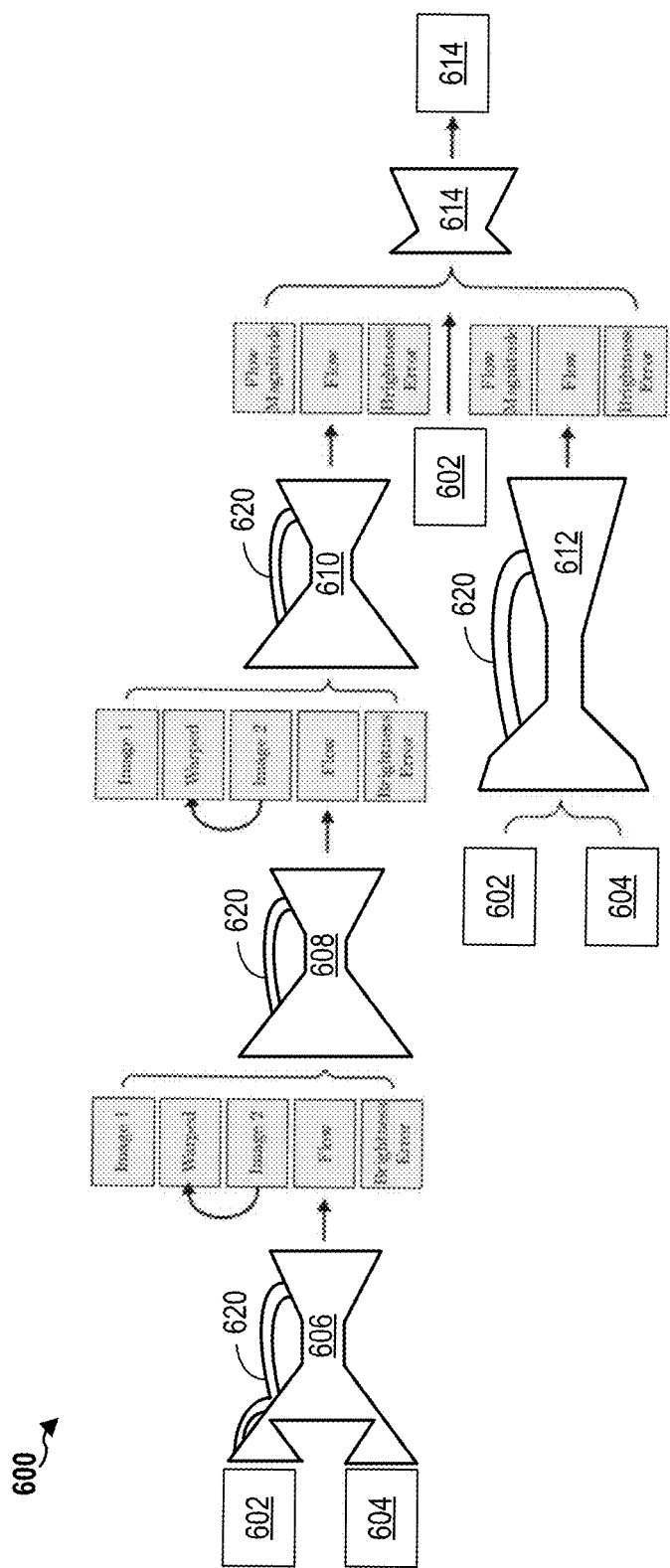
FIG. 6 illustrates an example of a flow network according to aspects of the present disclosure.

FIG. 6 illustrates an example of a residual flow network 600 according to aspects of the present disclosure. As shown in FIG. 6, the residual flow network 600 may stack multiple flow networks 606, 608, 610, 612. In some implementations, a first flow network 606 receives a target image 602 ($I_1$) and a warped source image 604 ($I_2$). The warped source image 604 may be generated from a depth estimate and a pose estimate (see FIG. 5). Subsequent flow networks 608, 610 receive the target image 602, the warped source image 604, and the flow estimate $w_i = (u_i, v_i)^T$, where i denotes an index of the network in the stack.

In one configuration, the warped source image 604 is warped via the flow $w_i$ and bilinear interpolation to generate a re-warped source image $\hat{I}_{2,i}$, such that a subsequent flow network 608, 610 focuses on a remaining increment between the target image 602 and the warped source image 604. The subsequent flow networks 608, 610 may also receive a brightness error $e_i = \|\hat{I}_{2,i} - I_1\|$.

The flow networks 606, 608, 610, 612 may be based on an encoder-decoder architecture. Each flow network 606, 608, 610, 612 may include explicit correlations of feature maps (e.g., skip connections 620). The first, second, and third networks 606, 608, 610 may identify large displacements. A fourth network 612 may identify small displacements. The fourth network 612 also receives the target image 602 and the warped source image 604.

A fusion network 614 receives a flow estimate $w_1$, brightens error $e_i$, and flow magnitude from both the fourth network 612 and the third network 610. The fusion network 614 also receives the target image 602. The fusion network 614 generates a final flow estimate 616 based on the received inputs.

Conventional optical flow functions impose the same constraints everywhere in an image. In real-world images, a majority of pixels may be background pixels which do not move by themselves. Rather, the motion of these background pixels is a result of a depth in a camera's motion (e.g., ego motion). An optical flow network, such as the flow networks 606, 608, 610, 612 as described in FIG. 6, may be trained end to end.

An encoding portion of the network extracts a rich feature representation, The flow network may jointly process two input images (e.g., target image and warped source image). Alternatively, the flow network may separately process the two input images and correlate their features at a later stage of the encoding pipeline. For example, the first flow network 606 of FIG. 6 separately process the two input images and correlate their features at a later stage of the encoding pipeline.

A decoding portion of the flow network generates a high resolution flow. In some implementations, the decoding portion implements up-convolutional and receives features from the contraction portion of the flow network. The contraction portion may be provided via skip connections, such as the skip connections 620 as described in FIG. 6. In some implementations, the residual flow network 502 as described in FIG. 5, may be implemented as a flow network, such as one of the stacked flow networks 606, 608, 610, 612 as described in FIG. 6.

Aspects of the present disclosure do not include a flow refinement stage because the depth and pose networks do not produce a flow estimate. Rather, the depth and pose networks generate transformation between frames providing motion for all pixels. The transformation information may be encoded by the first warped source image, which is input to the flow network with the target image. The flow network outputs a second warped source image (e.g., residual flow) that corrects the pixels corresponding to motion that cannot be explained by the camera's own motion. The separation of the flow network from the depth and pose networks segments dynamic objects from static objects. Specifically, motion from static objects is relative and may be filtered by the first warped source image, such that the second warped source image accounts for dynamic objects.

Figure 7:
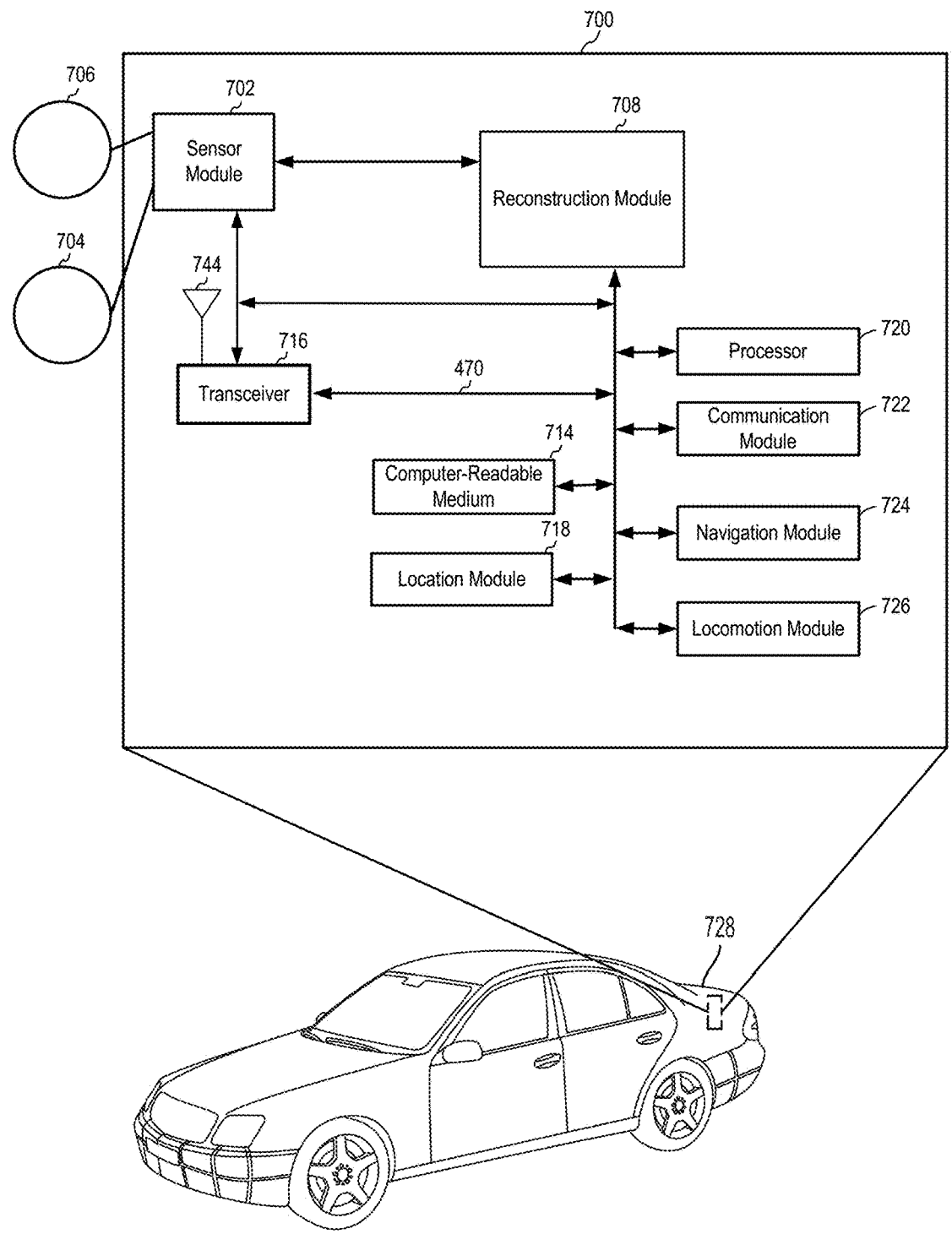
FIG. 7 is a diagram illustrating an example of a hardware implementation for a reconstruction system according to aspects of the present disclosure.

FIG. 7 is a diagram illustrating an example of a hardware implementation for target reconstruction system 700, according to aspects of the present disclosure. The target reconstruction system 700 may be a component of a vehicle, a robotic device, or another device. For example, as shown in FIG. 7, the target reconstruction system 700 is a component of a vehicle 728. Aspects of the present disclosure are not limited to the target reconstruction system 700 being a component of the vehicle 728, as other types of agents, such as a bus, boat, drone, or robot, are also contemplated for using the target reconstruction system 700.

The vehicle 728 may operate in one or more of an autonomous operating mode, a semi-autonomous operating mode, and a manual operating mode. Furthermore, the vehicle 728 may be an electric vehicle, a hybrid vehicle, a fuel vehicle, or another type of vehicle.

The target reconstruction system 700 may be implemented with a bus architecture, represented generally by a bus 470. The bus 470 may include any number of interconnecting buses and bridges depending on the specific application of the target reconstruction system 700 and the overall design constraints. The bus 470 links together various circuits including one or more processors and/or hardware modules, represented by a processor 720, a communication module 722, a location module 718, a sensor module 702, a locomotion module 726, a navigation module 724, and a computer-readable medium 714. The bus 470 may also link various other circuits such as timing sources, peripherals, voltage regulators, and power management circuits, which are well known in the art, and therefore, will not be described any further.

The target reconstruction system 700 includes a transceiver 716 coupled to the processor 720, the sensor module 702, a reconstruction module 708, the communication module 722, the location module 718, the locomotion module 726, the navigation module 724, and the computer-readable medium 714. The transceiver 716 is coupled to an antenna 744. The transceiver 716 communicates with various other devices over one or more communication networks, such as an infrastructure network, a V2V network, a V2I network, a V2X network, a V2P network, or another type of network. As an example, the transceiver 716 may transmit a warning to other agents when a reconstruction module 708 determines that an occluded area is occluding high risk information.

The target reconstruction system 700 includes the processor 720 coupled to the computer-readable medium 714. The processor 720 performs processing, including the execution of software stored on the computer-readable medium 714 providing functionality according to the disclosure. The software, when executed by the processor 720, causes the target reconstruction system 700 to perform the various functions described for a particular device, such as the vehicle 728, or any of the modules 702, 708, 714, 716, 718, 720, 722, 724, 726. The computer-readable medium 714 may also be used for storing data that is manipulated by the processor 720 when executing the software.

The sensor module 702 may be used to obtain measurements via different sensors, such as a first sensor 706 and a second sensor 704. The first sensor 706 may be a vision sensor, such as a stereoscopic camera or a red-green-blue (RGB) camera, for capturing 2D images. The second sensor 704 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 704, 706.

The measurements of the first sensor 706 and the second sensor 704 may be processed by one or more of the processor 720, the sensor module 702, the reconstruction module 708, the communication module 722, the location module 718, the locomotion module 726, the navigation module 724, in conjunction with the computer-readable medium 714 to implement the functionality described herein. In one configuration, the data captured by the first sensor 706 and the second sensor 704 may be transmitted to an external device via the transceiver 716. The first sensor 706 and the second sensor 704 may be coupled to the vehicle 728 or may be in communication with the vehicle 728.

The location module 718 may be used to determine a location of the vehicle 728. For example, the location module 718 may use a global positioning system (GPS) to determine the location of the vehicle 728. The communication module 722 may be used to facilitate communications via the transceiver 716. For example, the communication module 722 may be configured to provide communication capabilities via different wireless protocols, such as WiFi, long term evolution (LTE), 4G, etc. The communication module 722 may also be used to communicate with other components of the vehicle 728 that are not modules of the target reconstruction system 700.

The locomotion module 726 may be used to facilitate locomotion of the vehicle 728. As an example, the locomotion module 726 may control a movement of the wheels. As another example, the locomotion module 726 may be in communication with one or more power sources of the vehicle 728, such as a motor and/or batteries. Of course, aspects of the present disclosure are not limited to providing locomotion via wheels and are contemplated for other types of components for providing locomotion, such as propellers, treads, fins, and/or jet engines.

The target reconstruction system 700 also includes the navigation module 724 for planning a route or controlling the locomotion of the vehicle 728, via the locomotion module 726. In one configuration, the navigation module 724 engages a defensive driving mode when the reconstruction module 708 identifies a risky agent. The navigation module 724 may override user input when the user input is expected (e.g., predicted) to cause a collision. The modules may be software modules running in the processor 720, resident/stored in the computer-readable medium 714, one or more hardware modules coupled to the processor 720, or some combination thereof.

The reconstruction module 708 may be in communication with the sensor module 702, the transceiver 716, the processor 720, the communication module 722, the location module 718, the locomotion module 726, the navigation module 724, and the computer-readable medium 714. In one configuration, the reconstruction module 708 receives a sequence of images from the first sensor 706, such as a monocular camera. The reconstruction module 708 may include a scene reconstruction neural network, such as the scene reconstruction neural network 550 as described in FIG. 5. The reconstruction module 708 may generate a 3D reconstruction of a scene from each image in a set of images captured by the first sensor 706 (or the second sensor 704). In some implementations, the reconstruction module 708 may generate a first warped image based on a pose and a depth estimated from a current image and a previous image in a sequence of images captured by a sensor (e.g., the first sensor 706 or the second sensor 704) of the vehicle 728. The reconstruction module 708 may also estimate a motion of dynamic object between the previous image and the target image. Furthermore, the reconstruction module 708 may generate a second warped image from the first warped image based on the estimated motion. Additionally, working in conjunction with one or more of the location module 718, the locomotion module 726, and/or the navigation module 724, the reconstruction module 708 may control an action of an agent based on the second warped image.

The scene reconstruction neural network may in communication with and/or use one or more resources of the processor 720, the communication module 722, the location module 718, the locomotion module 726, the navigation module 724, and/or the computer-readable medium 714. The reconstruction module 708 may be configured to perform operations including operations of the process 800 described below with reference to FIG. 8.

The reconstruction module 708 may be in communication with one or more of the processor 720, the communication module 722, the location module 718, the locomotion module 726, the navigation module 724, and/or the computer-readable medium 714 to control an action of the vehicle 728 based on the 3D reconstruction.

Figure 8:
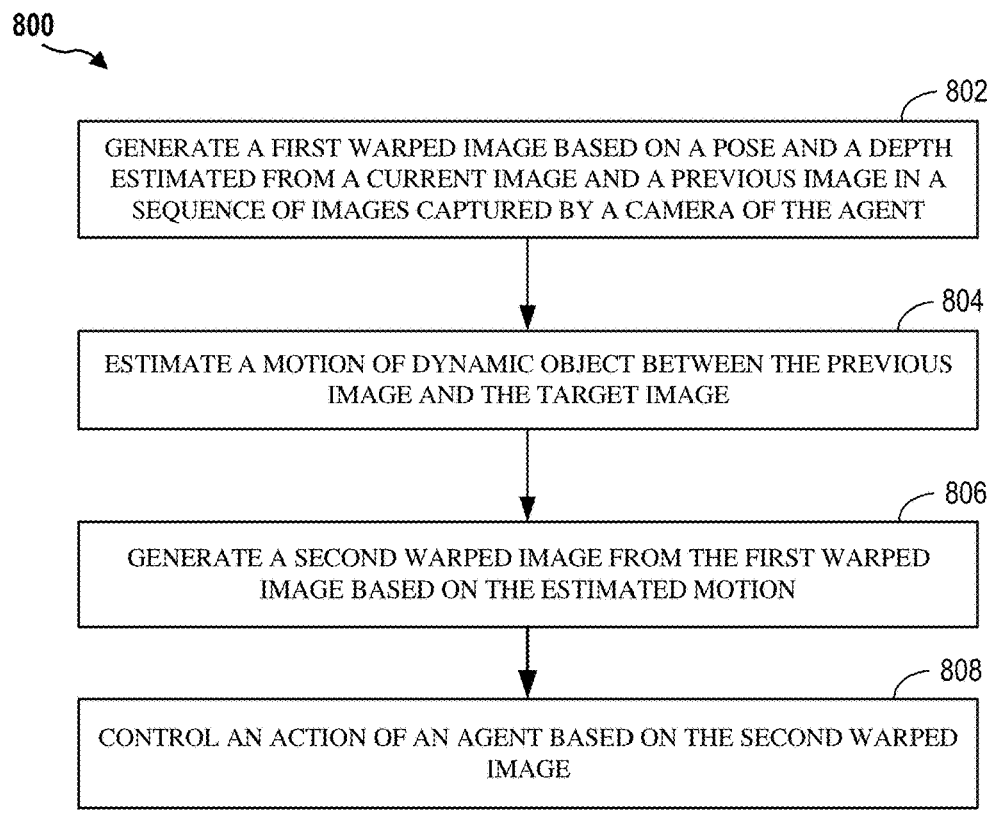
FIG. 8 illustrates a flow diagram for a method according to aspects of the present disclosure.

FIG. 8 illustrates a diagram illustrating an example process 800 in accordance with aspects of the present disclosure. The example process 800 is an example of generating a 3D reconstruction of a scene based on a monocular image of the scene, where the 3D reconstruction accounts for dynamic external motion and ego-motion. As shown in FIG. 8, at block 802, the process 800 includes generating a first warped image based on a pose and a depth estimated from a current image and a previous image in a sequence of images captured by a camera of the agent. The sequence of images may be captured via a monocoluar camera, such as an RGB camera. In some implementations, the pose corresponds to an ego-motion of the monocular camera. The monocoluar camera may be a component of an agent, such as a vehicle. The vehicle may be an autonomous vehicle or a semi-autonomous vehicle. The monocular camera may be integrated with a body of the agent.

At block 804, the process 800 includes estimating a motion of dynamic object between the previous image and the target image. The motion of the dynamic object may be referred to as a residual flow. The residual flow may be estimated based on a residual flow neural network.

At block 806, the process 800 includes generating a second warped image from the first warped image based on the estimated motion. The second warped image may account for the motion of dynamic objects. At block 808, the process 800 includes controlling an action of an agent based on the second warped image. For example, the agent may navigate through a scene based on the second warped image. The second warped image is an example of a 3D reconstruction of a scene based on a 2D image of the scene. The first warped image and the second warped image may be 3D images.

During a training stage, a training pipeline for the scene reconstruction network determines a first photometric loss between the target image and the first warped image. Additionally, the training pipeline determines a second photometric loss between the target image and the second warped image. Furthermore, the training pipeline trains a scene reconstruction system based on the first photometric loss and the second photometric loss.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling an agent, comprising:
    generating a first warped image based on a pose and a depth estimated from a target image and a previous image in a sequence of images captured by a camera of the agent;
    estimating a motion of a dynamic object between the previous image and the target image, the dynamic object being at a location that is different from a location of the agent;
    updating the first warped image based on the estimated motion of the dynamic object to generate a second warped image; and
    controlling an action of the agent based on the second warped image.

2. The method of claim 1, in which the camera comprises a monocular camera.

3. The method of claim 2, in which the pose corresponds to an ego-motion of the monocular camera.

4. The method of claim 1, further comprising generating the first warped image based on an inverse warp of the current image and the previous image.

5. The method of claim 1, in which each image of the sequence of images is a two-dimensional image.

6. The method of claim 1, in which the first warped image and the second warped image are three-dimensional images.

7. The method of claim 1, further comprising:
    determining a first photometric loss between the target image and the first warped image;
    determining a second photometric loss between the target image and the second warped image;
    training a scene reconstruction system based on the first photometric loss and the second photometric loss.

8. An apparatus for controlling an agent, the apparatus comprising:
    a processor;
    a memory coupled with the processor; and
    instructions stored in the memory and operable, when executed by the processor, to cause the apparatus:
        to generate a first warped image based on a pose and a depth estimated from a target image and a previous image in a sequence of images captured by a camera of the agent;
        to estimate a motion of a dynamic object between the previous image and the target image, the dynamic object being at a first location that is different from a second location of the agent;
        to update the first warped image based on the estimated motion of the dynamic object to generate a second warped image; and
        to control an action of the agent based on the second warped image.

9. The apparatus of claim 8, in which the camera comprises a monocular camera.

10. The apparatus of claim 9, in which the pose corresponds to an ego-motion of the monocular camera.

11. The apparatus of claim 10, in which the instructions further cause the apparatus to generate the first warped image based on an inverse warp of the current image and the previous image.

12. The apparatus of claim 8, in which each image of the sequence of images is a two-dimensional image.

13. The apparatus of claim 8, in which the first warped image and the second warped image are three-dimensional images.

14. The apparatus of claim 8, in which the instructions further cause the apparatus:
    to determine a first photometric loss between the target image and the first warped image;
    to determine a second photometric loss between the target image and the second warped image;
    to train a scene reconstruction system based on the first photometric loss and the second photometric loss.

15. A non-transitory computer-readable medium having program code recorded thereon for controlling an agent, the program code executed by a processor and comprising:
    program code to generate a first warped image based on a pose and a depth estimated from a target image and a previous image in a sequence of images captured by a camera of the agent;
    program code to estimate a motion of a dynamic object between the previous image and the target image, the dynamic object being at a first location that is different from a second location of the agent;
    program code to update the first warped image based on the estimated motion of the dynamic object to generate a second warped image; and
    program code to control an action of the agent based on the second warped image.

16. The non-transitory computer-readable medium of claim 15, in which the camera comprises a monocular camera.

17. The non-transitory computer-readable medium of claim 16, in which the pose corresponds to an ego-motion of the monocular camera.

18. The non-transitory computer-readable medium of claim 17, in which the program code further comprises program code to generate the first warped image based on an inverse warp of the current image and the previous image.

19. The non-transitory computer-readable medium of claim 15, in which each image of the sequence of images is a two-dimensional image.

20. The non-transitory computer-readable medium of claim 15, in which the first warped image and the second warped image are three-dimensional images.

* * * * *